US010807614B2

United States Patent
Manfredi et al.

(10) Patent No.: US 10,807,614 B2
(45) Date of Patent: Oct. 20, 2020

(54) COUPLING DEVICE INTENDED TO COUPLE A VEHICLE TO A TRACTION CABLE OF A TRANSPORTATION INSTALLATION

(71) Applicant: LST, Sainte-Helene-du-Lac (FR)

(72) Inventors: Rémi Manfredi, Saint Baldoph (FR); Ludovic Bibollet-Ruche, Saint Christophe sur Guiers (FR)

(73) Assignee: LST, Sainte-Helene-Du-Lac (FR)

( * ) Notice: Subject to any disclaimer, the term of this patent is extended or adjusted under 35 U.S.C. 154(b) by 277 days.

(21) Appl. No.: 15/739,512

(22) PCT Filed: Jun. 17, 2016

(86) PCT No.: PCT/FR2016/051483
§ 371 (c)(1),
(2) Date: Dec. 22, 2017

(87) PCT Pub. No.: WO2017/001742
PCT Pub. Date: Jan. 5, 2017

(65) Prior Publication Data
US 2018/0178814 A1 Jun. 28, 2018

(30) Foreign Application Priority Data
Jun. 30, 2015 (FR) ...................................... 15 56115

(51) Int. Cl.
*B61B 12/12* (2006.01)
*F16F 1/12* (2006.01)
(52) U.S. Cl.
CPC ............ *B61B 12/122* (2013.01); *F16F 1/128* (2013.01)

(58) Field of Classification Search
CPC ... B61B 12/122; B61B 12/002; B61B 12/127; B61B 9/00; B61B 12/12; F16F 1/128; Y10T 403/599
See application file for complete search history.

(56) References Cited

U.S. PATENT DOCUMENTS 4,760,798 A * 8/1988 Blengini ............... B61B 12/122
104/209
5,111,751 A 5/1992 Zlotek

FOREIGN PATENT DOCUMENTS

FR 2656579 A1 7/1991
WO 3501257 A1 3/1985

OTHER PUBLICATIONS

English Translation to FR2656579 Abstract (Jul. 1991).
International Search Report for Application No. PCT/FR2016/051483 (2016).

* cited by examiner

*Primary Examiner* — Mark T Le
(74) *Attorney, Agent, or Firm* — Cantor Colburn LLP

(57) ABSTRACT

This coupling device comprises a support body, a first clamping jaw, a clamping member comprising a second clamping jaw and a connecting portion, the clamping member being hingedly mounted on the support body between a clamping position in which the first and second clamping jaws are configured to clamp a traction cable; a biasing device configured to bias the clamping member towards the clamping position, and an actuation member configured to actuate a displacement of the clamping member between its clamping and release positions, the actuation member being slidably mounted on the support body between a first stable position in which the clamping member is in the clamping position, and a second stable position in which the clamping member is in the release position.

18 Claims, 3 Drawing Sheets

COUPLING DEVICE INTENDED TO COUPLE A VEHICLE TO A TRACTION CABLE OF A TRANSPORTATION INSTALLATION

CROSS REFERENCE TO RELATED APPLICATIONS

This application is a National Stage of PCT Application No. PCT/FR2016/051483 filed on Jun. 17, 2016, which claims priority to French Patent Application No. 15/56115 filed on Jun. 30, 2015, the contents each of which are incorporated herein by reference thereto.

TECHNICAL FIELD

The present invention concerns a coupling device intended to couple a vehicle, for example a cable car or a chairlift, to a traction cable of a transport installation.

BACKGROUND

The document U.S. Pat. No. 5,111,751 describes such a coupling device which comprises in particular:
- a support body,
- a first clamping jaw fixedly mounted relative to the support body,
  - a clamping member comprising a second clamping jaw and a connecting arm including a first end portion secured to the second clamping jaw and a second end portion opposite to the second clamping jaw, the clamping member being hingedly mounted on the support body about a first hinge axis between a clamping position in which the first and second clamping jaws are configured to clamp the traction cable and a release position in which the first and second clamping jaws are configured to release the traction cable,
  - an actuation lever configured to actuate a displacement of the clamping member between the clamping and release positions thereof, the actuation lever being bent and comprising a first lever portion hingedly mounted on the connecting arm about a second hinge axis between a first position in which the clamping member is in the clamping position, and a second position in which the clamping member is in the release position, and a second lever portion equipped with a declutch roller, and
  - a biasing device configured to bias the clamping member towards the clamping position, the biasing device comprising a first mounting portion hingedly mounted on the actuating lever about a third hinge axis, and a second mounting portion hingedly mounted on the support body about a fourth hinge axis.

Such a configuration of the coupling device results in the first position of the actuation lever, and therefore of the declutch roller, being dependent on the diameter of the traction cable portion clamped by the first and second clamping jaws. Thus, the position of the declutch roller is likely to vary both horizontally and vertically depending on the diameter of the traction cable portion clamped by the first and second clamping jaws. This therefore results in a high incertitude on the position of the declutch roller at the end station entrance.

In order to ensure cooperation between the declutch roller and a declutch rail disposed at the end station entrance, and therefore a release of the traction cable, it is thus necessary to provide a complex and wide width declutch rail. However, the use of such a declutch rail induces, during the opening of the coupling device, impacts of the declutch roller against the declutch rail which are likely in long term to impair the operation of the coupling device. Furthermore, such impacts are a source of discomfort and inconvenience for the users.

Furthermore, the use of such a declutch rail complicates the transport installation.

BRIEF SUMMARY

The present invention aims to remedy these drawbacks.

The technical problem underlying the invention therefore consists in providing a coupling device which is of simple and reliable structure, while allowing limiting the noise pollution generated during its opening and simplifying the structure of the declutch rails used to declutch the coupling device.

To this end, the present invention concerns a coupling device intended to couple a vehicle, for example a cable car or a chairlift, to a traction cable of a transport installation, the coupling device comprising at least:
- a support body,
- a first clamping jaw fixedly mounted relative to the support body,
  - a clamping member comprising a second clamping jaw and a connecting portion connected to the second clamping jaw, the clamping member being hingedly mounted on the support body about a first hinge axis between a clamping position in which the first and second clamping jaws are configured to clamp the traction cable and a release position in which the first and second clamping jaws are configured to release the traction cable,
  - a biasing device configured to bias the clamping member towards the clamping position, and
  - an actuation member configured to actuate a displacement of the clamping member between the clamping and release positions thereof, the actuation member being slidably mounted relative to the support body along a displacement direction,
- the biasing device and the actuation member being configured so as to define a first stable position of the actuation member in which the clamping member is in the clamping position, and a second stable position of the actuation member in which the clamping member is in the release position.

Such a configuration of the coupling device, and in particular such a sliding mounting of the actuation member on the support body, allows greatly reducing the variations of the first position of the actuation member, therefore of a declutch roller carried by the actuation member, according to the diameter of the traction cable portion clamped by the first and second clamping jaws. These arrangements allow using simpler and lower width declutch rails, and thus on the one hand simplifying the transport installation and on the other hand reducing the intensity of the impacts of the declutch roller against the declutch rail during the opening the coupling device. This results in a reduction of the noise pollution generated during the opening of the coupling device.

Such a mounting of the actuation member further ensures a displacement of the declutch roller carried by the actuation member along a rectilinear path, which allows greatly simplifying the structure of the clutch and declutch rails intended to cooperate with such a declutch roller.

The coupling device may further have one or more of the following feature(s), taken alone or in combination.

According to an embodiment of the invention, the coupling device is intended to couple a vehicle to a hauling-traction cable of the transport installation.

According to an embodiment of the invention, the actuation member is slidably mounted on the support body between the first stable position in which the clamping member is in the clamping position, and the second stable position in which the clamping member is in the release position.

According to an embodiment of the invention, the actuation member comprises at least one stop portion configured to cooperate with the support body when the actuation member is in the first stable position. These arrangements allow eliminating the variations of the first position of the actuation member, and therefore freezing the first position of the actuation member, regardless of the diameter of the traction cable portion clamped by the first and second clamping jaws. This results in the possibility of using declutch rails even simpler and of a width close to the diameter of the clutch roller carried by the actuation member, and therefore of further reducing the intensity of the impacts of the declutch roller against the declutch rail and the noise pollution generated during the opening of the coupling device.

According to an embodiment of the invention, the stop portion is configured to limit the sliding stroke of the actuation member towards the first and second clamping jaws.

According to an embodiment of the invention, the stop portion comprises a substantially planar stop surface configured to cooperate with a substantially planar bearing surface formed on the support body.

According to an embodiment of the invention, the biasing device comprises a first mounting portion hingedly mounted on the connecting portion about a second hinge axis, and a second mounting portion hingedly mounted on the actuation member about a third hinge axis.

According to an embodiment of the invention, the biasing device is interposed between the connecting portion and the actuation member.

According to an embodiment of the invention, the biasing device and the actuation member are configured so as to define an unstable intermediate position of the actuation member in which the second and third hinge axes extend in a reference plane orthogonal to the displacement direction, the unstable intermediate position being disposed between the first and second stable positions, the biasing device being configured to bias the actuation member towards the first stable position thereof when the actuation member goes over the unstable intermediate position in the direction of the first and second clamping jaws, and to bias the actuation member towards the second stable position thereof when the actuation member goes over the unstable intermediate position opposite to the first and second clamping jaws.

According to an embodiment of the invention, the coupling device is configured such that, as soon as the third hinge axis goes over the reference plane opposite to the first and second clamping jaws, the biasing device biases the actuation member towards the second stable position thereof, and such that, as soon as the third hinge axis goes over the reference plane in the direction of the first and second clamping jaws, the biasing device biases the actuation member towards the first position thereof.

According to an embodiment of the invention, the coupling device is configured such that, when the clamping member is in the clamping position, the third hinge axis is disposed on the side of the first and second clamping jaws relative to the reference plane, and such that, when the clamping member is in the release position, the third hinge axis is disposed on the opposite side of the first and second clamping jaws relative to the reference plane.

According to an embodiment of the invention, the first, second, and third hinge axes are substantially parallel.

According to an embodiment of the invention, the biasing device further comprises at least one compression spring configured to bias the first and second mounting portions at a distance from each other.

According to the embodiment shown in the figures, the coupling device comprises two biasing devices which may for example be disposed symmetrically on either side of a plane of symmetry of the coupling device.

According to an embodiment of the invention, the compression spring comprises a first end portion bearing against the first mounting portion, and a second end portion bearing against the second mounting portion.

According to an embodiment of the invention, the biasing device further comprises a guide rod about which the compression spring extends, the guide rod comprising a first end portion secured to the second mounting portion and a second end portion slidably mounted in a passage opening defined by the first mounting portion.

According to an embodiment of the invention, the biasing device comprises a stop member configured to limit the elongation of the compression spring.

According to an embodiment of the invention, the stop member is fastened on the guide rod, and for example on the second end portion of the guide rod.

According to an embodiment of the invention, the stop member is configured to bear against the first mounting portion when the actuation member is in the second stable position.

According to an embodiment of the invention, the support body includes at least one guide portion, and the actuation member includes at least one sliding portion slidably mounted on the at least one guide portion.

According to an embodiment of the invention, the guide portion is delimited outwardly by a cylindrical surface. Advantageously, the guide portion is of a constant section, and for example of a circular section.

According to an embodiment of the invention, the support body includes two guide portions which are substantially parallel and spaced from each other. The two guide portions are for example arranged on either side of the biasing device.

According to an embodiment of the invention, the at least one sliding portion is tubular, and extends around the at least one guide portion.

According to an embodiment of the invention, the second mounting portion of the biasing device is hingedly mounted on the at least one sliding portion.

According to an embodiment of the invention, the actuation member includes two sliding portions slidably mounted respectively on two guide portions of the support body.

According to an embodiment of the invention, the coupling device comprises a clutch/declutch member mounted on the actuation member, the clutch/declutch member being intended to cooperate with at least one declutch rail and at least one clutch rail extending along the displacement path of the coupling device.

According to an embodiment of the invention, the clutch/declutch member includes a clutch/declutch roller movably mounted in rotation about an axis of rotation carried by the actuation member. According to an embodiment of the invention, the axis of rotation is substantially orthogonal to the first hinge axis.

According to an embodiment of the invention, the actuation member includes a support portion on which the clutch/declutch member is mounted. According to an embodiment of the invention, the support portion is opposite to the first and second clamping jaws relative to the at least one sliding portion.

According to an embodiment of the invention, the actuation member includes a connecting portion connecting the support portion to the at least one sliding portion. According to an embodiment of the invention, the connecting portion includes two connecting branches configured to connect respectively one of the sliding portions to the support portion.

According to an embodiment of the invention, the connecting portion of the clamping member includes a first connecting part connected to the second clamping jaw, and a second connecting part on which the first mounting portion is hingedly mounted. According to an embodiment of the invention, the first and second connecting parts are inclined relative to each other.

According to an embodiment of the invention, the coupling device is configured such that a displacement of the actuation member from its first stable position to its second stable position induces a sliding of the actuation member opposite to the first and second clamping jaws.

According to an embodiment of the invention, the coupling device includes bearing rollers mounted on the support body and configured to cooperate with guide members belonging to the transport installation.

BRIEF DESCRIPTION OF THE DRAWINGS

In any case, the invention will be better understood using the following description with reference to the appended schematic drawing showing, by way of non-limiting example, an embodiment of this coupling device.

DETAILED DESCRIPTION

Figure 1:
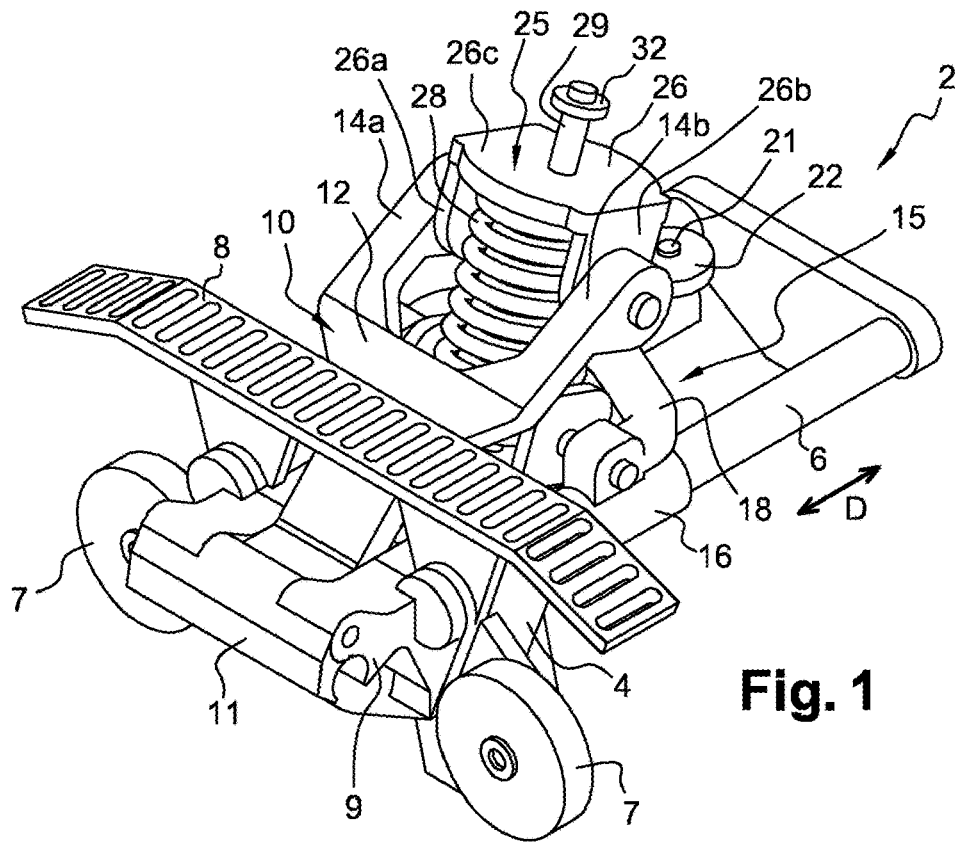
FIGS. 1 and 2 are perspective views of a coupling device according to the invention.

FIGS. 1 to 6 show a declutchable coupling device 2, also called declutchable coupling clip, intended to couple a vehicle, for example a cable car or a chairlift, to a traction cable 3 of an air transport installation by a traction cable. Such a coupling of the vehicle to the traction cable 3, via the coupling device 2, allows displacing the vehicle between two end stations of the transport installation. According to an embodiment of the invention, the traction cable 3 may be a hauling-traction cable.

The coupling device 2 comprises a support body 4 intended to extend transversely to the traction cable 3, and more particularly substantially perpendicularly to the traction cable 3, when the coupling device 2 is coupled to the traction cable 3. The support body 4 is intended to be connected to a hanger 5 supporting a vehicle (not shown in the figures), such as a cable car or chairlift, for example.

The support body 4 includes at least one cylindrical guide portion 6 whose function will be explained below. According to the embodiment shown in the figures, the support body 4 includes two guide portions 6 which are substantially parallel and spaced from each other. However, the support body 4 might include a single guide portion 6.

Figure 2:
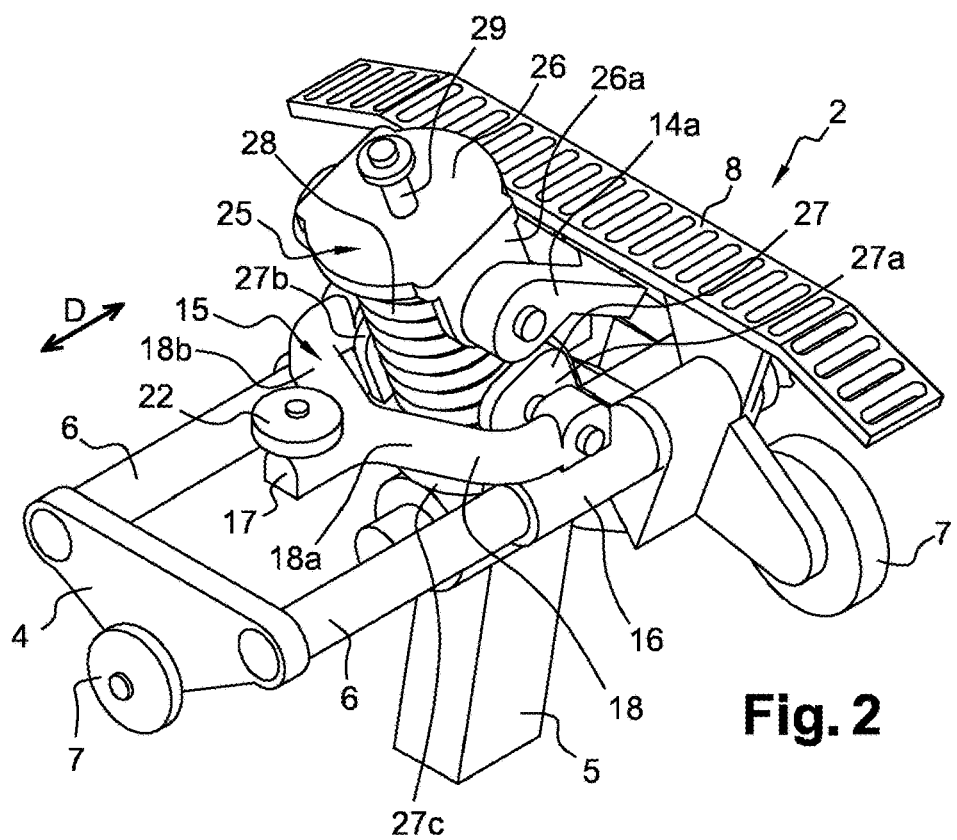
Figure 3:
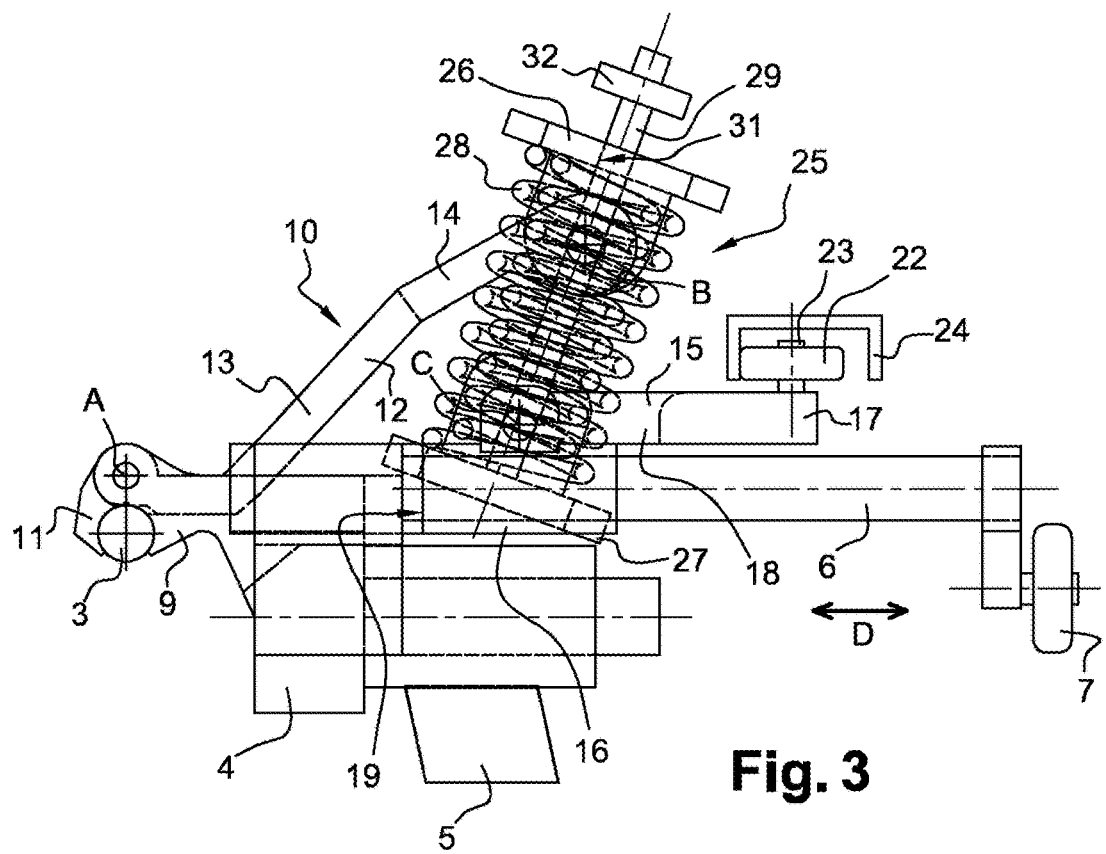
FIG. 3 is a side view of the coupling device of FIG. 1 coupled to a traction cable.

As shown only in FIGS. 1 and 2, the support body 4 carries bearing rollers 7 configured to cooperate with guide rails (not shown in the figures) belonging to the transport installation and disposed in the end stations of the transport installation. The support body 4 further carries a drive pad or crossmember 8 configured to cooperate with complementary drive means of the transport installation. The bearing rollers 7 and the drive pad 8 are more particularly configured to allow a displacement of the coupling device 2, declutched from the traction cable 3, on and along the guide rails.

The coupling device 2 also comprises a first clamping jaw 9 fixedly mounted relative to the support body 4. The first clamping jaw 9 is advantageously disposed at a front end of the support body 4.

The coupling device 2 further comprises a clamping member 10 comprising a second clamping jaw 11 and a connecting portion 12 extending from the second clamping jaw 11. According to an embodiment of the invention, the clamping member 10 is a one-piece part. Nevertheless, according to another embodiment of the invention, the second clamping jaw 11 might be added and fastened on the connecting portion 12.

The connecting portion 12 more particularly includes a first connecting part 13 secured to the second clamping jaw 11 and a second connecting part 14 opposite to the second clamping jaw 11 and extending from the first connecting part 13. According to the embodiment shown in the figures, the second connecting part 14 is formed by two connecting branches 14a, 14b which are substantially parallel and spaced from each other.

The clamping member 10 is hingedly mounted on the support body 4 about a first hinge axis A, located near the first clamping jaw 9, between a clamping position (shown in FIG. 3) in which the first and second clamping jaws 9, 11 are configured to clamp the traction cable 3 and a release position (shown in FIG. 6) in which the first and second clamping jaws 9, 11 are configured to release the traction cable 3. The clamping member 10 is more particularly configured such that the second connecting part 14 of the connecting portion 12 is closer to the support body 4 when the clamping member 10 is in the release position, than when the clamping member 10 is in the clamping position.

The coupling device 2 is advantageously configured such that the first clamping jaw 9 is located inwardly of the coupling device 2 and the second clamping jaw 11 is turned outwardly of the coupling device 2. Furthermore, the first and second clamping jaws 9, 11 are advantageously configured to clamp the traction cable 3 on top.

The coupling device 2 also comprises an actuation member 15 configured to actuate a displacement of the clamping member 10 between the clamping and release positions thereof.

According to the embodiment shown in the figures, the actuation member includes two sliding portions 16, a support portion 17 opposite to the first and second clamping jaws 9, 11 relative to the sliding portions 16, and a connecting portion 18 configured to connect the support portion 17 to each of the sliding portions 16. According to the embodiment shown in the figures, the actuation member 15 has a general Y shape. However, the actuation member 15 might have a completely different shape, and it might in particular include a single sliding portion 16.

Each sliding portion 16 of the actuation member 15 is advantageously tubular, and is slidably mounted around a respective guide portion 6 along a displacement direction D between a first position (shown in FIG. 3) in which the clamping member 10 is in the clamping position, and a second position (shown in FIG. 6) in which the clamping member 10 is in the release position. Each sliding portion 16 of the actuation member 15 is also displaceable in a plurality of intermediate positions disposed between the first and second positions, and in particular in a first and second intermediate portions shown in FIGS. 4 and 5.

Each sliding portion 16 advantageously comprises a stop surface 19 configured to cooperate with a respective bearing surface 21 provided on the support body 4, when the actuation member 15 is in the first position. Each stop surface 19 is thus configured to limit the pivoting stroke of the actuation member 15 towards the first and second clamping jaws 9, 11.

The coupling device 2 is more particularly configured such that a displacement of the actuation member 15 from the first position to the second position induces a sliding of the sliding portions 16 opposite to the first and second clamping jaws 9, 11.

The support portion 17 of the actuation member 15 is equipped with a clutch/declutch roller 22 movably mounted in rotation about an axis of rotation 23 fastened on the support portion 17. The clutch/declutch roller 22 is configured to cooperate with declutch and clutch rails 24 belonging to the transport installation and extending along the displacement path of the coupling device 2, so as to guide a displacement of the actuation member 15 between the first and second positions thereof.

As shown more particularly in FIGS. 1 and 2, the connecting portion 18 of the actuation member 15 includes two connecting branches 18a, 18b each configured to connect one of the sliding portions 16 to the support portion. 17.

The coupling device 2 further comprises a biasing device 25 interposed between the actuation member 15 and the connecting portion 12, and configured to bias the clamping member 10 towards the clamping position thereof. According to a variant of the invention, the coupling device 2 might comprise two biasing devices 25 disposed symmetrically on either side of a plane of symmetry of the coupling device 2.

The biasing device 25 includes more particularly a first mounting portion 26 hingedly mounted on the second connecting part 14 of the clamping member 10 about a second hinge axis B, and a second mounting portion 27 hingedly mounted on the actuation member 15 about a third hinge axis C. The first, second and third hinge axes A, B, C are advantageously substantially parallel.

According to the embodiment shown in the figures, the first mounting portion 26 is a mounting yoke including two mounting flanges 26a, 26b hingedly mounted respectively on the two branches 14a, 14b of the second connecting part 14, and a bottom wall 26c connecting the two mounting flanges 26a, 26b. According to such an embodiment, the second mounting portion 27 is also a mounting yoke including two mounting flanges 27a, 27b hingedly mounted respectively on the two branches 18a, 18b of the actuation member 15, and a bottom wall 27c connecting two mounting flanges 27a, 27b.

The biasing device 25 further comprises at least one compression spring 28 configured to bias the first and second mounting portions 26, 27 away from each other. According to the embodiment shown in the figures, the biasing device 25 comprises two compression springs 28 coaxially disposed. Nevertheless, the biasing device 25 might comprise only one compression spring 28.

Each compression spring 28 is advantageously helical, and comprises a first end portion bearing against a bearing face delimited by the first mounting portion 26, and a second end portion bearing against a bearing face delimited by the second mounting portion 27. The coupling device 2 is advantageously configured such that each compression spring 28 is compressed when the clamping member 10 is in the clamping position.

The biasing device 25 also comprises a guide rod 29 around which the two compression springs 28 extend. The guide rod 29 comprises a first end portion secured to the second mounting portion 27 and a second end portion slidably mounted in a passage opening 31 delimited by the first mounting portion 26.

The biasing device 25 further comprises a stop member 32 configured to limit the elongation or release of each compression spring 28, and thus the spacing of the first and second mounting portions 26, 27. According to the embodiment shown in the figures, the stop member 32 of the biasing device 25 is fastened on the second end portion of the guide rod 29, and is configured to bear against the first mounting portion 26 when the clamping member 10 is in the release position.

Figure 4:
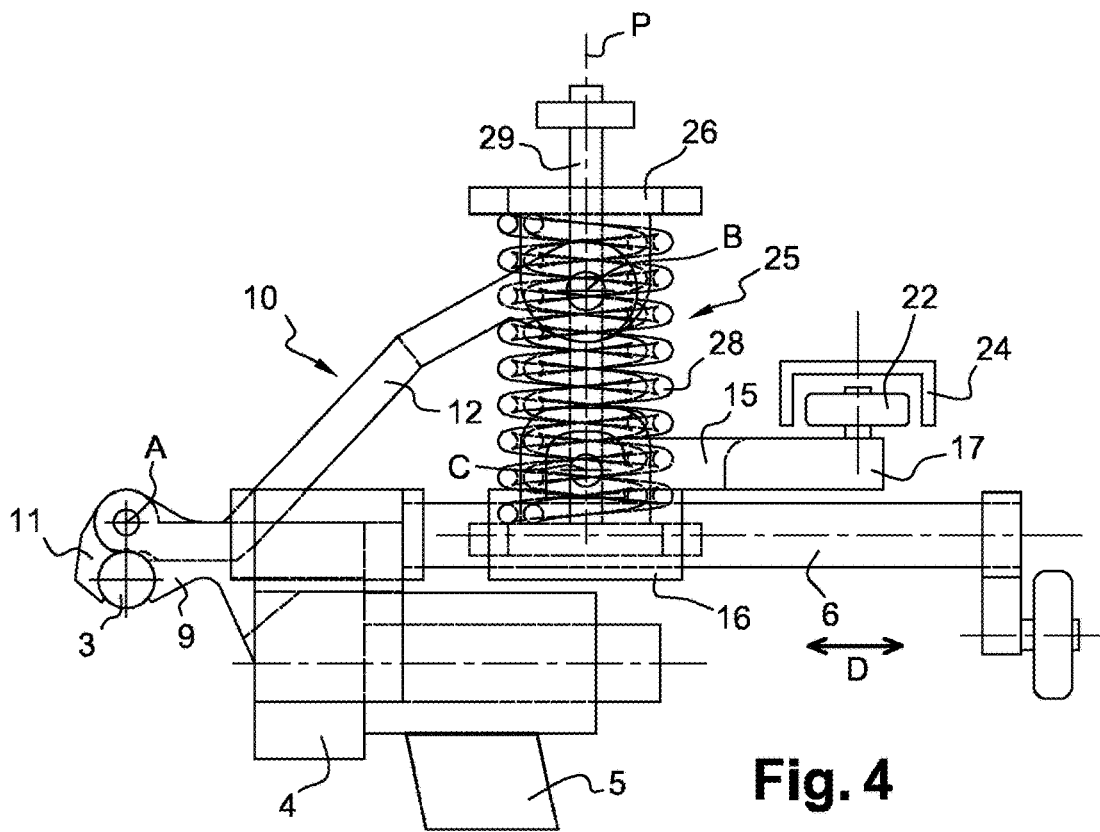
FIGS. 4 and 5 are side views of the coupling device of FIG. 1 in intermediate operating positions.
Figure 5:
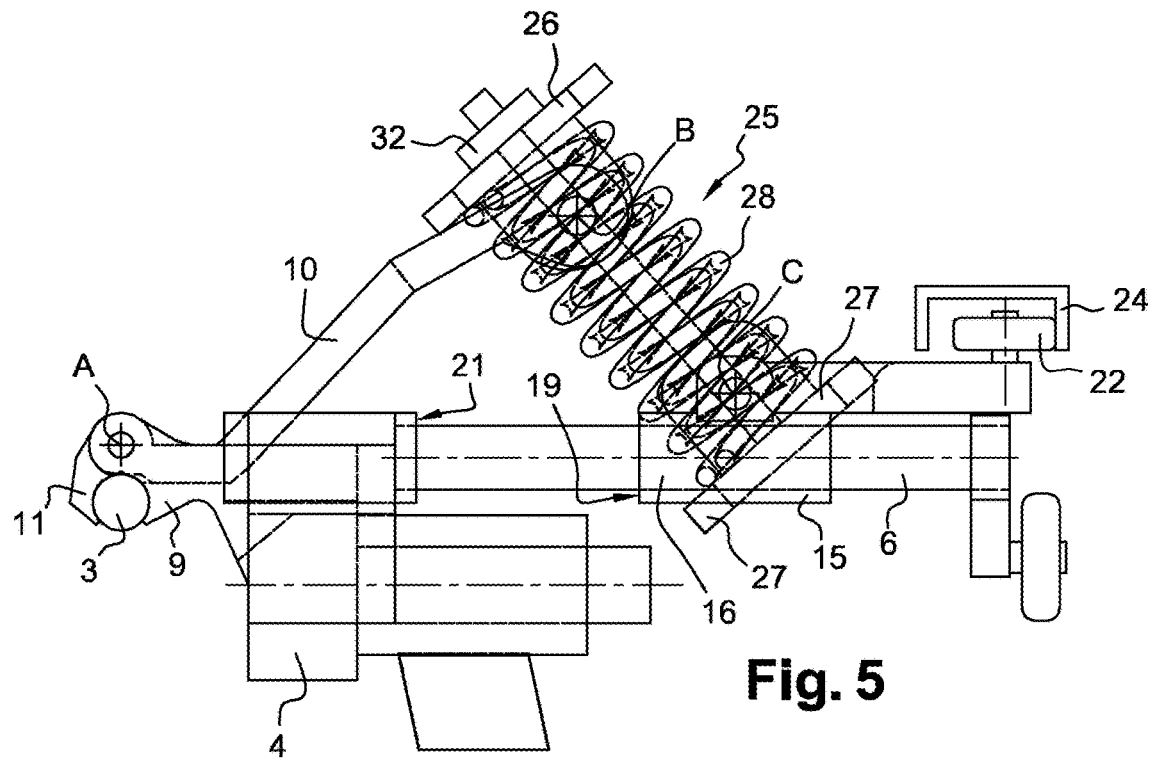
Figure 6:
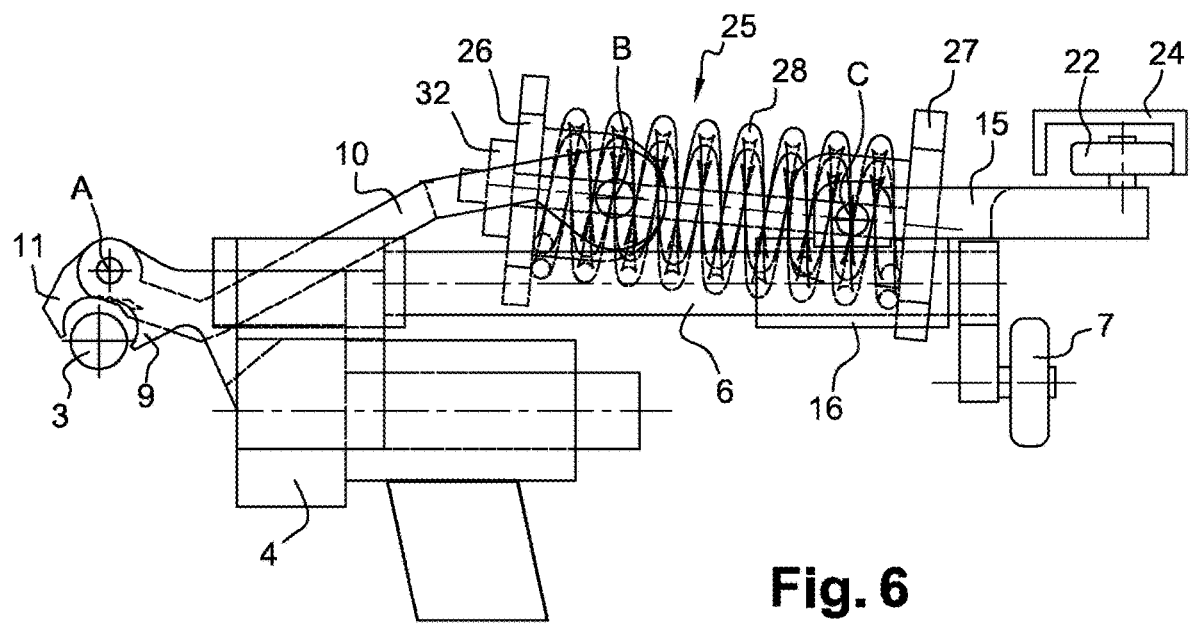
FIG. 6 is a side view of the coupling device of FIG. 1 in a release position of the traction cable.

The biasing device 25 and the actuation member 15 are more particularly configured such that the first and second positions of the actuation member 15 are stable, and that the different intermediate positions of the actuation member 15 disposed between the first and second positions, and in particular the first and second intermediate positions shown in FIGS. 4 and 5, are unstable. It should be noted that, in the first intermediate position shown in FIG. 4, the second and third hinge axes B, C extend in a reference plane P, also called a switch plane, orthogonal to the displacement direction D.

The coupling device 2 is also configured such that, when the clamping member 10 is in the clamping position, the third hinge axis C is arranged on the side of the first and second clamping jaws 9, 11 relative to the reference plane P, and such that, when the clamping member 10 is in the release position, the third hinge axis C is arranged on the opposite side to the first and second clamping jaws 9, 11 relative to the reference plane P.

The coupling device 2 is more particularly configured such that, as soon as the third hinge axis C goes over the reference plane P opposite to the first and second clamping jaws 9, 11, the biasing device 25 biases the actuation member 15 towards the second stable position thereof, and such that, as soon as the third hinge axis C goes over the reference plane P in the direction of the first and second clamping jaws 9, 11, the biasing device 25 biases the actuation member 15 towards the first position thereof.

The operation of the coupling device 2 will now be described by considering that the coupling device 2 is initially coupled to a traction cable 3, and therefore that the clamping member 10 is in the clamping position.

At the entrance of an end station of the transport installation, the clutch/declutch roller 22 cooperates with a declutch rail 24 shaped to guide the actuation member 15 towards the second stable position thereof. The actuation member 15 then progressively slides opposite to the first and second clamping jaws 9, 11.

As soon as the actuation member 15 goes over the first unstable intermediate position shown in FIG. 4, that is to say as soon as the third hinge axis C goes over the reference plane P, each compression spring 28 is released and also biases the actuation member 15 towards the second position thereof. In order to prevent a brutal and noisy ejection of the actuation member 15 towards the second position thereof, the declutch rail 24 accompanies and guides the actuation member 15 to the second position thereof.

Such a displacement of the actuation member 15 causes a pivoting of the connecting portion 12 towards the support body 4 and therefore a displacement of the clamping member 10 to the release position. Such a displacement of the clamping member 10 induces a release of the traction cable and a declutch of the vehicle equipped with the coupling device 2.

After the release of the traction cable 3 by the coupling device 2, the declutched vehicle is guided along a transfer path, in particular by means of the bearing rollers 7, until the exit of the end station.

At the exit of the end station, the clutch/declutch roller 22 cooperates with a clutch rail (not shown in the figures) shaped to guide the actuation member 15 towards the first position thereof. The actuation member 15 then progressively slides along the direction of the first and second clamping jaws 9, 11, which causes a displacement of the third hinge axis C towards the first and second clamping jaws 9, 11.

Such a displacement of the actuation member 15 may be decomposed into a first phase during which the clamping member 10 is displaced to its clamping position and each compression spring 28 is not compressed (see FIG. 5), and in a second phase during which each compression spring 28 is compressed.

When the actuation member 15 goes over the unstable intermediate position shown in FIG. 4, that is to say as soon as the third hinge axis C goes over the reference plane P in the direction of the first and second clamping jaws 9, 11, each compression spring 28 biases the actuation member 15 to its first stable position, and the clamping member 10 is then stabilized in the clamping position. In order to avoid a brutal and noisy displacement of the actuation member 15 towards the first position thereof, the clutch rail accompanies and guides the actuation member 15 to the first position thereof.

Of course, the invention is not limited to the sole embodiment of this coupling device, described above as example, it encompasses, on the contrary, all the variants.

The invention claimed is:

1. A coupling device intended to couple a vehicle to a traction cable of a transport installation, the coupling device comprising at least:
    a support body,
    a first clamping jaw fixedly mounted relative to the support body,
    a clamping member comprising a second clamping jaw and a connecting portion connected to the second clamping jaw, the clamping member being hingedly mounted on the support body about a first hinge axis between a clamping position in which the first and second clamping jaws are configured to clamp the traction cable and a release position in which the first and second clamping jaws are configured to release the traction cable,
    a biasing device configured to bias the clamping member towards the clamping position, and
    an actuation member configured to actuate a displacement of the clamping member between its clamping and release positions, the actuation member being slidably mounted relative to the support body along a displacement direction,
    the biasing device and the actuation member being configured so as to define a first stable position of the actuation member in which the clamping member is in the clamping position, and a second stable position of the actuation member in which the clamping member is in the release position and wherein the biasing device comprises a first mounting portion hingedly mounted on the connecting portion about a second hinge axis, and a second mounting portion hingedly mounted on the actuation member about a third hinge axis.

2. The coupling device according to claim 1, wherein the actuation member comprises at least one stop portion configured to cooperate with the support body when the actuation member is in the first stable position.

3. The coupling device according to claim 1, wherein the biasing device and the actuation member are configured so as to define an unstable intermediate position of the actuation member in which the second and third hinge axes extend in a reference plane orthogonal to the displacement direction, the unstable intermediate position being arranged between the first and second stable positions, the biasing device being configured to bias the actuation member towards its first stable position when the actuation member goes beyond the unstable intermediate position towards the first and second clamping jaws, and to bias the actuation member towards the second stable position thereof when the actuation member goes over the unstable intermediate position opposite to the first and second clamping jaws.

4. The coupling device according to claim 1, wherein the first, second and third hinge axes are substantially parallel.

5. The coupling device according to claim 1, wherein the biasing device further comprises at least one compression spring configured to bias the first and second mounting portions away from each other.

6. The coupling device according to claim 5, wherein the biasing device further comprises a guide rod around which the at least one compression spring extends, the guide rod comprising a first end portion secured to the second mounting portion and a second end portion slidably mounted in a passage opening delimited by the first mounting portion.

7. The coupling device according to claim 5, wherein the biasing device comprises a stop member configured to limit an elongation of the at least one compression spring.

8. The coupling device according to claim 1, wherein the support body includes at least one guide portion, and the actuation member includes at least one sliding portion slidably mounted on the at least one guide portion.

9. The coupling device according to claim 1, which comprises a clutch/declutch member mounted on the actuation member, the clutch/declutch member being intended to cooperate with at least one declutch rail and at least one clutch rail extending along a displacement path of the coupling device.

10. The coupling device according to claim 1, which is configured such that a displacement of the actuation member from its first stable position to its second stable position induces a sliding of the actuation member opposite to the first and second clamping jaws.

11. The coupling device according to claim 2, wherein the biasing device and the actuation member are configured so as to define an unstable intermediate position of the actuation member in which the second and third hinge axes extend in a reference plane orthogonal to the displacement direction, the unstable intermediate position being arranged between the first and second stable positions, the biasing device being configured to bias the actuation member towards its first stable position when the actuation member goes beyond the unstable intermediate position towards the first and second clamping jaws, and to bias the actuation member towards the second stable position thereof when the actuation member goes over the unstable intermediate position opposite to the first and second clamping jaws.

12. The coupling device according to claim 11, wherein the first, second and third hinge axes are substantially parallel.

13. The coupling device according to claim 3, wherein the first, second and third hinge axes are substantially parallel.

14. The coupling device according to claim 3, wherein the biasing device further comprises at least one compression spring configured to bias the first and second mounting portions away from each other.

15. The coupling device according to claim 4, wherein the biasing device further comprises at least one compression spring configured to bias the first and second mounting portions away from each other.

16. The coupling device according to claim 11, wherein the biasing device further comprises at least one compression spring configured to bias the first and second mounting portions away from each other.

17. The coupling device according to claim 2, wherein the support body includes at least one guide portion, and the actuation member includes at least one sliding portion slidably mounted on the at least one guide portion.

18. The coupling device according to claim 2, which comprises a clutch/declutch member mounted on the actuation member, the clutch/declutch member being intended to cooperate with at least one declutch rail and at least one clutch rail extending along a displacement path of the coupling device.

* * * * *